May 18, 1937.   O. JACOBSEN   2,080,891
PACKING FOR CENTRIFUGAL PUMPS AND THE LIKE
Filed Aug. 11, 1936
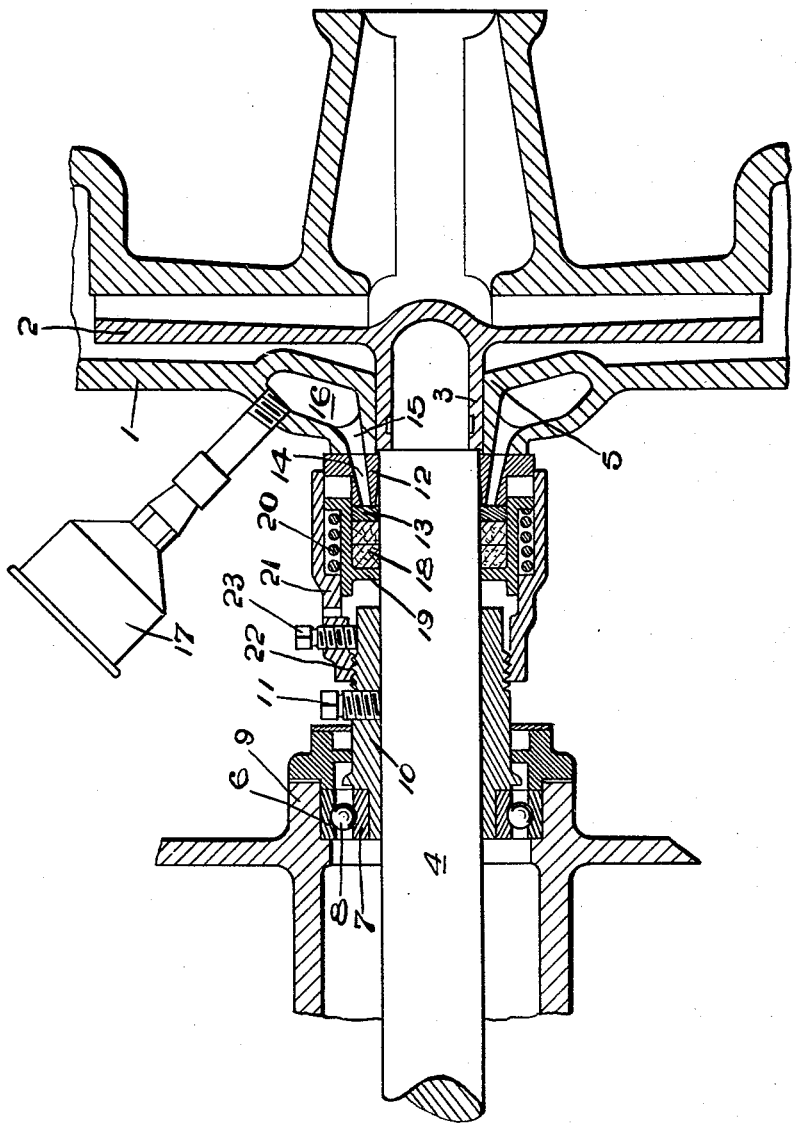
INVENTOR
OYSTEIN JACOBSEN
BY James C. Bradley
ATTORNEY.

Patented May 18, 1937

2,080,891

UNITED STATES PATENT OFFICE 2,080,891

PACKING FOR CENTRIFUGAL PUMPS AND THE LIKE

Oystein Jacobsen, Dayton, Ohio, assignor to The Duriron Company, Inc., a corporation of New York Application August 11, 1936, Serial No. 95,484

2 Claims. (Cl. 286—7)

The invention relates to packing means for the shafts of centrifugal pumps and the like. It has for its objects the provision of simple reliable packing arrangement which will remain tight for long periods of service without replacing the compressible packing employed and which imposes a minimum of frictional resistance against the rotation of the shaft. In order to accomplish this result, the gland carrying the compressible packing is caused to rotate with the shaft, and the wear between the relatively movable metallic thrust parts which must be kept tight is divided between two sets of surfaces involving members which are readily replaceable when the members become worn. One embodiment of the invention is shown in the accompanying drawing, wherein:

The figure is a longitudinal section through a pump and improved packing means for the shaft thereof.

Referring to the drawing, 1 is one side of the pump casing and 2 is the pump runner, or impeller, having attached in its central sleeve portion 3 the drive shaft 4, such sleeve constituting in effect a portion of the shaft which has its bearing in the hub portion 5 of the casing. Outward of this bearing is a second antifriction bearing comprising the races 6 and 7 and balls 8, the outer race 6 of the bearing being mounted in the fixed member 9, and the inner race 7 being mounted on the collar 10 secured to the shaft by the set screw 11 or other suitable means.

Intermediate the hub of the casing and the antifriction bearing is the packing construction constituting the subject matter of the invention, and serving to prevent the escape of liquid longitudinally of the shaft from the pump cavity. The element next to the hub or bearing 5 is the collar 12 having a pair of thrust surfaces at its ends lying at right angles to the axis of the shaft, one of such surfaces being in contact with the end surface of the hub while the other surface engages the face of a washer 13. The collar and washer are free to rotate with respect to the shaft, and the collar is provided with a plurality of passages 14 communicating with passages 15 in the hub 5 of the casing. The latter passages lead to a chamber 16 in the hub which is supplied with lubricant under pressure from the grease cup 17. This provides for the lubrication of the thrust surfaces at the two ends of the collar 12 which must be lubricated in order to prevent leakage and to prevent rapid wear.

Outward of the washer 13 is the compressible packing 18 of any suitable type carried in the gland 19. The gland is pressed to the right to compress the packing and to make tight contact between the lubricated thrust surfaces above described by means of a spring 20. The spring 20 is housed in a sleeve 21 which is threaded at its left end on the collar 10, as indicated at 22. This provides for the adjustment of the sleeve 21 to increase or decrease the tension of the spring 20 and so regulate the tightening of the packing 18 on the shaft and the degree of pressure between the thrust surfaces at the ends of the collar 10. To hold the sleeve 21 from turning from its position of adjustment, the set screw 23 is provided.

In operation the sleeve 21, the gland 19 and packing 18 all turn with the shaft, so that there is little wear upon the packing. The cost of packing and any requirement for adjustment, therefore, is reduced to a minimum. The washer 13 turns with the shaft and the packing, and this tends to rotate the collar 12, but this turning of the collar 12 is resisted by the friction between the thrust surface at the other end of the collar and the opposing surface at the end of the hub, so that the collar rotates at a speed which is substantially less than the speed of rotation of the shaft. The wear at the thrust surfaces at the two ends of the collar is thus divided so that the frequency of any replacement of the washer or collar is reduced. These parts may also be made of a composition relatively much softer than the hub of the casing, so that the wear on the thrust surface at the end of the hub is negligible. Due to the pressure imposed on the thrust surfaces by the spring 20 and the lubrication thereof from the chamber 16, as heretofore explained, no leakage whatever occurs at these points. Further, since the wear on the construction is restricted almost entirely to the washer 20 and collar 12, the cost of any replacements is low, as these parts are relatively small and cheap.

What I claim is:

1. In combination, a bearing member, a shaft having a running fit therein, and packing means for preventing leakage along the shaft outward of the bearing comprising a collar free to rotate on the shaft with two thrust faces transverse to the axis of the shaft one of which engages the end face of the bearing, a washer on the shaft engaging the other thrust face of the collar, a gland on the shaft forward of the washer having a cavity for packing in opposition to the washer, packing in the gland engaging the washer, a sleeve surrounding the gland movable longitudinally thereof, spring means between the sleeve and gland arranged so that a movement of the sleeve longitudinally of the shaft toward said bearing compresses the spring and causes the gland to compress the packing against the washer, a collar on the shaft outward of said sleeve secured to the shaft so as to rotate therewith, a connection between the sleeve and said last collar permitting the adjustment of the sleeve longitudinally thereof, and means on the bearing for supplying lubricant to the two thrust faces of the first mentioned collar.

2. In combination, a bearing member having a thrust face at its outer end, a shaft having a running fit in the bearing, a collar fixed to the shaft remote from the bearing and rotatable with the shaft, a second collar loose on the shaft having thrust faces at its ends transverse to the axis of the shaft one of which engages the thrust face on the bearing, a gland on the shaft intermediate said collars provided with a recess, packing in the recess in opposition to the second collar, a washer between the packing and the outer thrust face of said second collar, means carried by the first mentioned collar rotatable therewith and adjustable longitudinally thereof for applying yielding pressure tending to move the gland toward the second collar whereby the packing is compressed and caused to yieldingly press said washer against the thrust face of the second collar, and means for supplying lubricant to the thrust faces of the collar.

O. JACOBSEN.